US009264355B2

(12) United States Patent
Eriksson et al.

(10) Patent No.: US 9,264,355 B2
(45) Date of Patent: Feb. 16, 2016

(54) NAME-ADDRESS MANAGEMENT AND ROUTING IN COMMUNICATION NETWORKS

(75) Inventors: Anders Eriksson, Kista (SE); Börje Ohlman, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1989 days.

(21) Appl. No.: 11/515,381

(22) Filed: Sep. 5, 2006

(65) Prior Publication Data

US 2008/0056207 A1    Mar. 6, 2008

(51) Int. Cl.
| H04L 12/56 | (2006.01) |
| H04L 12/66 | (2006.01) |
| H04L 29/12 | (2006.01) |
| H04W 40/34 | (2009.01) |
| H04W 8/02 | (2009.01) |
| H04W 80/04 | (2009.01) |
| H04L 29/08 | (2006.01) |

(52) U.S. Cl.
CPC .............. *H04L 45/741* (2013.01); *H04L 12/66* (2013.01); *H04L 29/12066* (2013.01); *H04L 29/12103* (2013.01); *H04L 61/1511* (2013.01); *H04L 61/1535* (2013.01); *H04W 40/34* (2013.01); *H04L 67/24* (2013.01); *H04W 8/02* (2013.01); *H04W 80/04* (2013.01)

(58) Field of Classification Search
USPC ........................................................ 370/408
See application file for complete search history.

(56) References Cited

U.S. PATENT DOCUMENTS

| 5,884,311 | A | * | 3/1999 | Blattmann-Bleile et al. | |
| 5,937,343 | A | * | 8/1999 | Leung ........................... | 455/403 |
| 6,148,307 | A | * | 11/2000 | Burdick et al. | |
| 6,973,057 | B1 | * | 12/2005 | Forslow ........................ | 370/328 |
| 7,203,175 | B2 | * | 4/2007 | Thubert et al. ................ | 370/254 |
| 7,333,461 | B2 | * | 2/2008 | Thubert et al. ................ | 370/338 |
| 7,428,221 | B2 | * | 9/2008 | Thubert et al. ................ | 370/255 |
| 7,453,842 | B2 | | 11/2008 | Yamamoto | |

(Continued)

FOREIGN PATENT DOCUMENTS

| CN | 1675896 A | 9/2005 |
| EP | 1 515 505 | 3/2005 |

(Continued)

OTHER PUBLICATIONS

Devarapalli et al., RFC 3963—Network Mobility (NEMO) Basic Support Protocol, http://www.ietf.org/rfc/rfc3963.text.

(Continued)

*Primary Examiner* — Dang Ton
*Assistant Examiner* — Mandish Randhawa
(74) *Attorney, Agent, or Firm* — Patent Portfolio Builders, PLLC

(57) ABSTRACT

A set of globally-reachable attachment registers is provided for interconnected communications networks and hosts. At least some of the networks and hosts each has a corresponding attachment register. The attachment registers are not located with their respective network or host. Information is stored in the attachment registers that establishes one or more logical links between the attachment registers. The information in certain ones of the attachment registers is used to perform one or more network communication functions. Non-limiting example functions include location registration and update, name to global locator resolution, routing, multi-homing, dynamic ISP selection, and handover.

42 Claims, 11 Drawing Sheets

(56) References Cited

U.S. PATENT DOCUMENTS

| | | | |
|---|---|---|---|
| 2002/0098840 A1* | 7/2002 | Hanson et al. | 455/435 |
| 2002/0112067 A1* | 8/2002 | Chang et al. | 709/232 |
| 2003/0092443 A1* | 5/2003 | Hiyama et al. | 455/435 |
| 2003/0212863 A1* | 11/2003 | Ganguly et al. | 711/118 |
| 2004/0032852 A1 | 2/2004 | Thubert et al. | |
| 2004/0163024 A1* | 8/2004 | Kawai et al. | 714/748 |
| 2006/0218206 A1* | 9/2006 | Bourbonnais et al. | 707/202 |
| 2006/0291404 A1 | 12/2006 | Thubert et al. | |
| 2007/0086359 A1* | 4/2007 | Yaqub | 370/254 |
| 2007/0153707 A1* | 7/2007 | Thubert et al. | 370/254 |
| 2007/0195826 A1* | 8/2007 | Wang et al. | 370/498 |

FOREIGN PATENT DOCUMENTS

| | | |
|---|---|---|
| WO | WO 02/100071 | 12/2002 |
| WO | WO 2007/145552 | 12/2007 |

OTHER PUBLICATIONS

RFC 2136—Dynamic Updates in the Domain Name (DNS Update), http://www.faqs.org/rfcs/rfc2136.html.

Notification of Transmittal of the International Search Report and the Written Opinion of the International Searching Authority in PCT/SE2007/050083 dated Dec. 6, 2007.

Caesar et al., ROFL: Routing on Flat Labels, University of California at Berkeley, SIGCOMM'06, Sep. 11-15, 2006, Pisa, Italy.

Eriksson et al., Dynamic Internetworking Based on Late Locator Construction, IEEE Global Internet Symposium 2007, May 11, 2007, pp. 67-72.

Ahlgren et al., A Node Identify Internetworking Architecture, Apr. 29, 2006.

U.S. Appl. No. 12/377,914, filed Feb. 18, 2009; Inventor: Eriksson, A.

Chinese office action and English translation of office action mailed Mar. 24, 2011 in corresponding Chinese application No. 2007800329286.

Office Action mailed Apr. 1, 2011 in co-pending U.S. Appl. No. 12/377,914.

International Preliminary Report on Patentability, mailed Nov. 24, 2008, in corresponding Application No. PCT/EP2007/059188.

International Search Report, mailed Dec. 27, 2007, in corresponding Application No. PCT/EP2007/059188.

Supplementary European Search Report dated May 24, 2013 in European Application No. EP 07 70 9476.

\* cited by examiner $AR_x$    Attachment Register for host or moving network x
H    host
LR    Location Register
M    Moving Network
old host locator:    a/c/f/j/$h_k$
new host locator: b/d/f/j/$h_k$

NAME-ADDRESS MANAGEMENT AND ROUTING IN COMMUNICATION NETWORKS

TECHNICAL FIELD

The technical field relates to packet communications in data networks, and more particularly, to node name-address management and routing issues in communication networks such as name-to-address resolution and name-address registration.

BACKGROUND

Name-address management generally includes issues such as name-to-address resolution and name-address registration. Name-to-address resolution is a procedure by which a "name" of a network resource, e.g., a network node, is resolved or translated into a routable network address, i.e., a location in the network topology. Name-address registration is the corresponding registration procedure by which the name and the assigned network address of the resource are registered in the network. The name of the resource is normally known to users and typically also stays the same over relatively long periods of time.

The Domain Name System (DNS) stores and provides information associated with domain names in a distributed database in networks such as the Internet. The DNS associates domain names with many types of information, but most importantly it provides the IP address for a given domain name. DNS makes it possible to associate easy-to-remember domain names (such as ericsson.com) with hard-to-remember IP addresses. DNS is suitable for resources that rarely change their location, but is not adapted for mobility. RFC 2136 describes "Dynamic Updates in the Domain Name System" in the hope of providing better support for rapid updates of DNS, but it is still far from being suitable for keeping track of roaming resources such as mobile phones and their users.

When routing protocols for the Internet and other fixed networks were initially created, hosts were not expected to move around. Therefore, hosts are usually named by their point of attachment to the network, e.g., IP addresses. Examples of such routing protocols include RIP, IS-IS, OSPF, BGP and PNNI. They are all well established technologies but have limited support for mobility and have convergence problems when network topologies change rapidly.

Traditionally, applications use IP-addresses in a way that does not allow them to change during an on-going session. To allow hosts to move without changing their IP-addresses (at least from an application perspective) mobility solutions in IP networks, such as Manet (ad hoc networks), Nemo, and Mobile IP have been developed. But these are fairly complex solutions since they adapt a technology intended for fixed networks to new mobility requirements.

The Host Identity Protocol (HIP) provides a method of separating the end-point identifier and locator roles of IP addresses. It introduces a new Host Identity (HI) name space based on public keys. The public keys are typically self-generated. A Node ID architecture aims to take advantage of the HIP separation to provide end-to-end connectivity over different locator domains. Even still, routing protocols under development cater to mobility of individual hosts (nodes) but do not adequately address the problems relating to moving networks (MNs). A moving network includes a group of many mobile hosts that move together as a group. Moving network examples include networks located in any type of mobile vehicle, e.g., in a train, airplane, bus, ship, subway, etc., but are not limited to vehicles. All that is required is that the group of mobile hosts and routers move substantially together at substantially the same time. Also, a communication satellite carrying a router is another example of a moving network that dynamically attaches to ground stations, other communication satellites, and hosts or mobile phones. A particular mobility problem associated with moving networks is a potentially huge number of registration or other location updates that need to be signalled and processed whenever the moving network changes location. Such a move may cause an "update storm."

Consider for example a Public Land Mobile Network (PLMN) type of system like GSM and 3G cellular networks. Mobile host name resolution is handled via a Home Location Register (HLR) and the Visited Location Register (VLR). When a mobile host is called, a phone number (MS-ISDN) is resolved via the VLR and HLR into a corresponding E.164 address that allows the call to be routed to the mobile host, if the mobile host with the MS-ISDN has registered its current location area with the VLR. Local mechanisms are used to route the call to the specific cell in the location area in which the mobile host is currently located.

The HLR and VLR have overall good performance and security support regarding name resolution in cellular systems. But they are closely linked to the E.164 address structure and as such do not provide an open architecture for other and/or arbitrary name and address spaces. Moreover, this approach to registering a host with a centralized location register like the HLR/VLR does not function well with moving networks. The problem is particularly acute when a large moving network with many subnetworks or hosts roams and requires registration update signalling for every one of its subnetworks and/or hosts—a good example of an "update storm" mentioned above.

In dynamic DNS, when such a moving network roams, each host in the moving network must have its DNS record updated. For that situation, mobile IP requires that all home agents having hosts in the mobile network be updated. RFC 3963 describes the IETF Network Mobility (NEMO) basic support protocol which enables mobile networks to attach to different points in the Internet. The protocol is an extension of mobile IPv6 and allows session continuity for every node in the Mobile Network as the network moves. It also allows every node in the Mobile Network to be reachable while moving around. But NEMO's distributed solution suffers from what is called "pinball routing," where all internetwork traffic must be routed between every mobility agent that has an associated moving node or network in the path towards the destination host. As a result, tunnelling overhead accumulates per radio hop, and there are potential latency problems when several mobility agents are located at different continents, i.e., x-ogonal routing instead of triangular routing.

SUMMARY

A set of globally-reachable attachment registers is provided for interconnected communications networks and hosts. At least some of the networks and hosts each has a corresponding attachment register. Information is stored in the attachment registers that establishes one or more logical links between the attachment registers. The information in certain ones of the attachment registers is used to perform one or more network communication functions. Non-limiting example functions include location registration and update, name to global locator resolution, routing, multi-homing, dynamic ISP selection, and handover.

In an example implementation, the attachment registers are not located with their respective network or host, and the interconnected networks and hosts may be configured as a hierarchical network topology. The attachment registers are preferably located in a network at a highest level of the hierarchical topology. The logical links include an association with a name of a network or host and a pointer associated with a neighbor network of that network or host. The logical links may be established as part of a registration operation. The pointer points to one or more of the following: a name of the neighbor network, a global locator of the attachment register corresponding to the neighbor network, and a combination of a name of the neighbor network and a local locator of a point of attachment to the neighbor network. The logical link for a network closest to a highest level network in the hierarchy includes an association with a name of the closest network and a pointer pointing to a highest level network locator associated with a point of attachment of the closest network to the highest level network. For purposes here, the term "locator" is a general term that covers any type of communications network address or identifier that allows a communications node in communications network to be located within the communications network topology.

In one example non-limiting application, at least some of the networks are movable networks and at least some of the hosts are mobile hosts. Unlike mobile registration/location approaches described in the background, the attachment registers do not store a global locator of each movable host's current location.

When a network (movable or fixed) changes from a first point of attachment in the interconnected networks at an old neighbor node to a second point of attachment at a new neighbor node, the attachment register corresponding to the one network is simply updated to change a logical link from the attachment register corresponding to the first neighbor node to the attachment register corresponding to the second neighbor node. Updates for the attachment registers associated with other hosts and networks affected by this changed location of the network are not required.

One important use for the logical link information is name-locator resolution. One or more of the globally-reachable attachment registers may be queried to obtain or modify logical link information in the one or more attachment registers. Each host and network has a name and is addressable using a corresponding network locator. The logical link information may be used to resolve a name of a host to a global network locator of a host attached to one of the networks. A correspondent host queries a sequence of attachment registers associated with the host and with networks located in the internetwork along a path between the host and a highest level network to generate a list of items including the host name, names of networks traversed along the path, and a locator of an attachment point to the highest level network. The correspondent host uses the list of items to generate the global network locator of the host.

Other example applications include using the logical link information to perform routing related signaling on behalf of certain ones of the networks and hosts, mobility related signaling, multi-homing related signaling, dynamic Internet server (ISP) selection related signaling, and handover related signaling particularly on behalf of movable networks and mobile hosts using their corresponding attachment registers.

Advantageously, the attachment register-based technology prevents roaming events at or close to higher levels of the network topology from requiring other networks or hosts in the network topology to update their location registrations. Only a network or host node that changes its local point of attachment needs to update its location registration in its attachment register. Because name registration is performed in a distributed fashion, each host and network only needs to register with its dedicated attachment register. There is no need for a centralized location register (e.g., like an HLR or VLR in a cellular network) that handles all mobility or other location registrations. Significantly, in a moving network context, "update storms" are avoided because all lower level hosts and networks in the network topology do not have to update their mobility registrations when a moving network at a higher level in the network topology moves to a new attachment point. The global locator obtained in the name-locator resolution procedure can be used to route a packet along the shortest path from a source to a destination, thus avoiding the so-called pin-ball routing problem of the Nemo solution.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using a non-limiting example application to moving communication networks configured in a tree type network topology, this technology has application to any communications network application. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

The technology provides a network name and location management architecture and methodology that facilitates and/or minimizes network management signalling in a variety of areas, some non-limiting examples of which include location registration and update, name to global locator resolution, routing, multi-homing, dynamic ISP selection, and handover. One non-limiting example application is to moving networks (as defined in the background), where each moving network is coupled to multiple communication hosts, and each host corresponding to a communications node of some sort. Non-limiting example hosts include cell phones, lap top computers, and PDAs. Non-limiting examples of moving networks include personal area networks (PANs) and vehicular area networks (VAN). A personal area network (PAN) is a network used for communication among electronic devices like phones, laptops, PDAs, MP3 players, etc. close to one person. The devices may or may not belong to that person in question. PANs can be used for communication among the personal devices themselves (intrapersonal communication), or for connecting to a higher level network and the Internet. The PAN may be wired or wireless, e.g., a piconet in BLUETOOTH. A vehicular area network (VAN) is used to interconnect networks and hosts within a vehicle, e.g., to interconnect PANs and hosts within a train. A VAN can also have connectivity with fixed networks, such as the Internet. Moving networks and hosts are assumed to be interconnected in "tree" structure, where the root of a tree is a network attached to a root network. Branches interconnect adjacent networks, and each host connected to such a network is considered to be a leaf of the tree.

Figure 1:
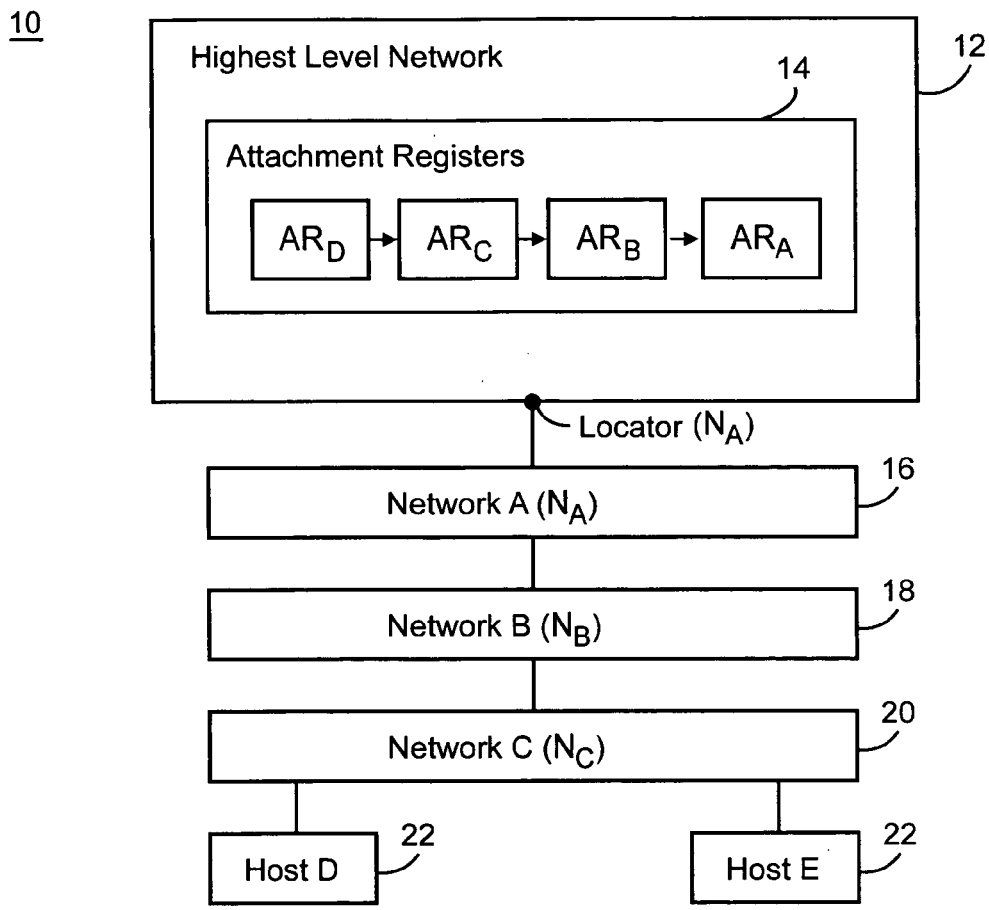
FIG. 1 is a function block diagram of a non-limiting example internetwork of networks and hosts in which a set of globally-reachable attachment registers is used to perform one or more network communication functions.

Reference is now made to FIG. 1 which is a function block diagram of a non-limiting example internetwork 10 of networks 12-20 and hosts 22 in which a set of globally-reachable attachment registers 14 is used to perform one or more network communication functions. As will become apparent, the globally-reachable attachment registers 14 can be viewed as a distributed database of sorts. Each attachment register may have a separate location, or the attachment registers may be distributed over different operators, where each operator has the option of locating its attachment registers in a centralized fashion. They are preferably, but not necessarily, located in a highest level network 12 in the internetwork configuration. Each attachment register is not located with its respective network or host. Alternatively, the database may be stored in the root network. In this example, each network A, B, and C in a path from the highest level network 12 to a host D has a corresponding attachment register $AR_A$, $AR_B$, and $AR_C$ as does host D. The attachment register of network A stores a locator of a point of attachment of network A to the highest level network 12. Not every network or host in the internetwork necessarily needs an attachment register.

Information is stored in the attachment registers that establishes one or more logical links between the attachment registers. In this example, the arrows indicate that information is stored in attachment register $AR_D$ that links or points to attachment register $AR_C$. Similarly, there is information stored in attachment register $AR_C$ that links or points to attachment register $AR_B$, and information is stored in attachment register $AR_B$ that links or points to attachment register $AR_A$. The information in these attachment registers creates a path to host D, and thus, allows easily construction of a global locator to host D. As mentioned, that information in these attachment registers can be used to perform other network communication functions as well. Some of the logical links are associated with communication links to neighbor networks and include a specification of performance parameters of that communication link including one or more of bandwidth, packet delay, or packet loss rate. Also, the attachment register of a network can store performance parameters for the edge-to-edge communication over that network.

Figure 2:
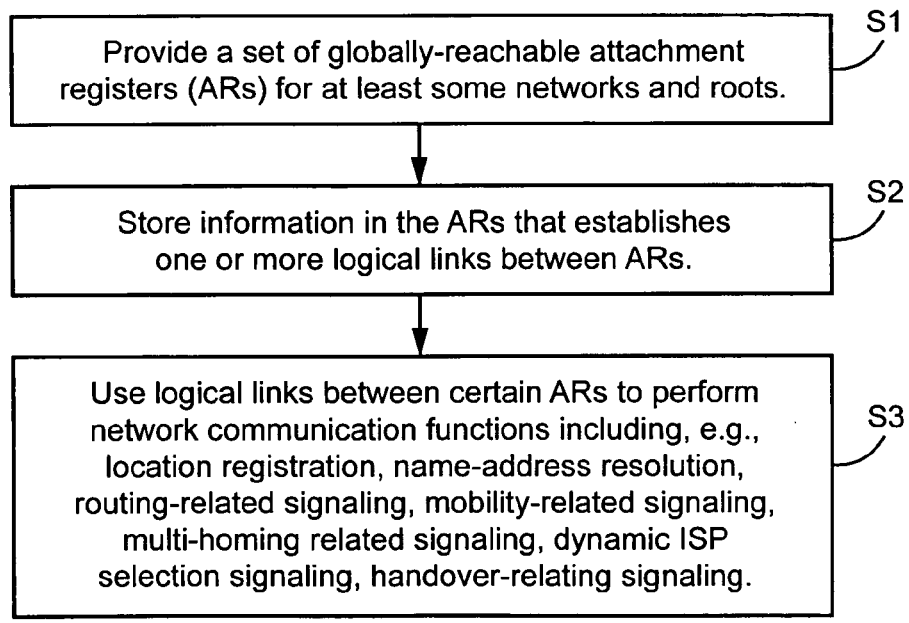
FIG. 2 is a flow chart diagram illustrating non-limiting, example procedures related to the attachment register based technology.

FIG. 2 is a flow chart diagram illustrating non-limiting, example procedures related to the attachment register based technology. A set of globally-reachable attachment registers is provided for interconnected communications networks and hosts (step S1). Globally-reachable means sufficiently locatable in a network so that any host or node can communicate with any one of the attachment registers. At least some of the networks and hosts each has a corresponding attachment register. Information is stored in the attachment registers that establishes one or more logical links between the attachment registers (step S2). The logical link information in certain ones of the attachment registers is used to perform one or more network communication functions (step S3). Non-limiting example functions include location registration and update, name to global locator resolution, routing, multi-homing, dynamic ISP selection, and handover.

Figure 3:
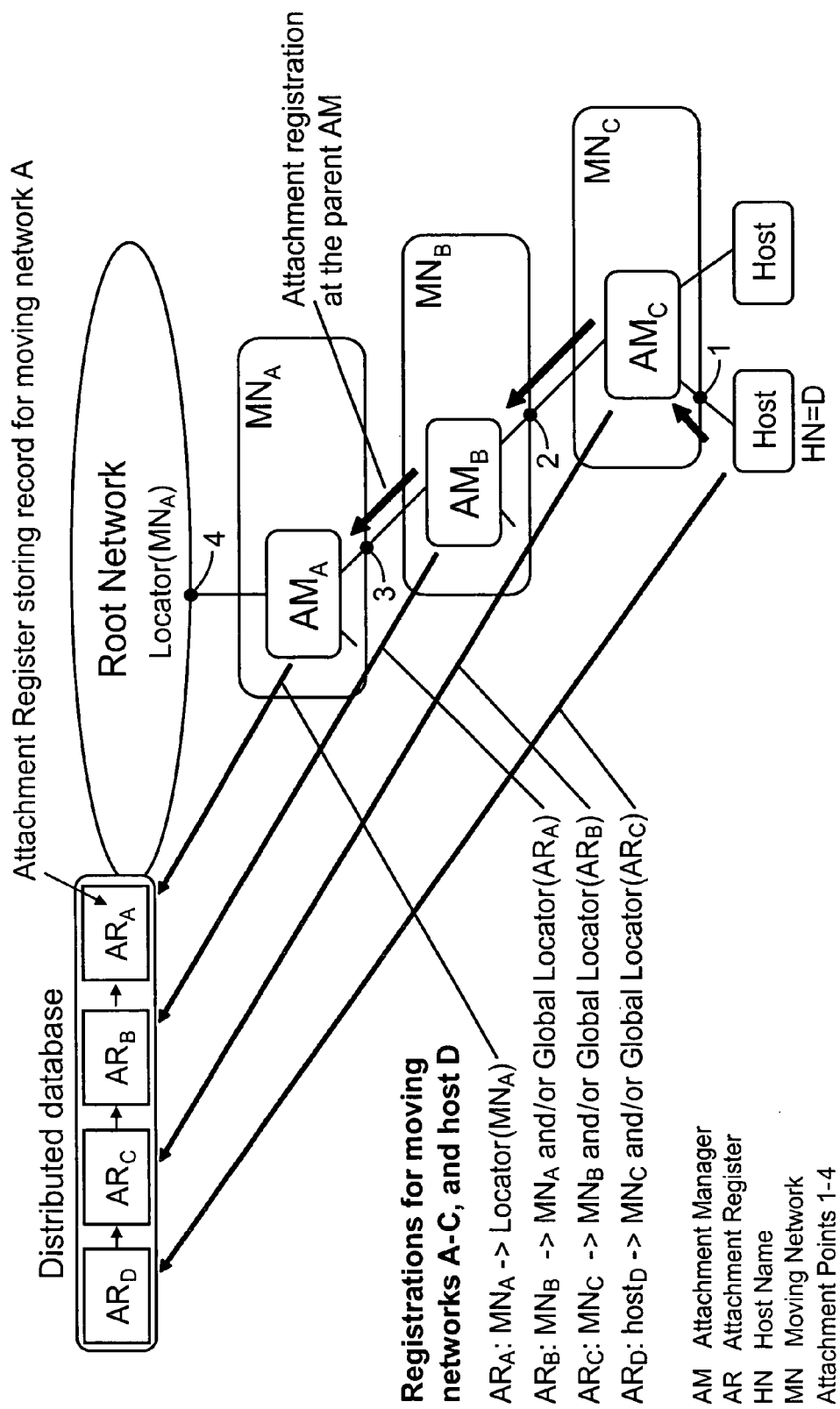
FIG. 3 illustrates a non-limiting example of mobility registration using globally-reachable and logically linked attachment registers.

FIG. 3 illustrates an example, non-limiting internetwork having a tree type hierarchical structure where the networks happen to be moving networks and the hosts are mobile. The highest level network in this tree topology is called a root network. To resolve a name of a host or a moving network to a global locator to that information can be directed so that host or moving network requires that a registration procedure be performed. Attachment registers for moving networks A-C and host D are shown. The name of the next highest level network, called here a parent network, to which the host or moving network is attached is stored in the moving network's corresponding attachment register. If the parent network is the root network, then the global network locator of the point of attachment to the root network is stored in that network's attachment register.

FIG. 3 illustrates example registration entries that may be stored in the attachment registers for moving networks A-C and for host D. The diagonal lines to the attachment registers indicate that the attachment registers are globally reachable by the host D and by the attachment managers in the moving networks. In an optional embodiment, some or all of that registration information may be stored in an Attachment Manager (AM) of the parent network. So, for example, host D registers with attachment register $AR_D$ and may also register with the attachment manager $AM_C$ in the parent node for host D corresponding to moving network $MN_C$. The registration in each attachment register includes its name (e.g., $AR_D$) and a pointer to the attachment register of the parent network (e.g., $AR_C$). That pointer may point to the parent network by name and/or a global locator of the attachment register corresponding to the parent network. For example, a global locator for the attachment register $AR_C$ for parent network $MN_C$ may be stored in attachment register $AR_D$. Optionally, the registration in an attachment register may include the local locator of the point of attachment to the parent network. For example, $AR_D$ may include a registration that host D is connected to a point of attachment in $MN_C$ that is addressed using a local locator that is unique only within the context of $MN_C$. Host D can learn this local locator from $MN_C$ when attaching to this network, and then register it in the attachment register $AR_D$.

In a similar fashion, moving network $MN_C$ registers with its attachment register $AR_C$ by storing the name $MN_B$ of the moving parent network to which it is attached and/or the global locator of the attachment register $AR_B$. Optionally, the local locator of the point of attachment to the parent network is also stored. Moving Network $MN_C$ may optionally also register with an Attachment Manager $AM_B$ located in moving parent network $MN_B$ by storing similar information at the Attachment Manager $AM_B$. This type of registration procedure is performed by every moving network and host in the tree that has a corresponding attachment register. But this registration is not as onerous as a typical registration. Advantageously, only local information related to the closest parent (or child) network is stored in an attachment register and optionally an attachment manager. There is no need to propagate the registration above the closest parent network. The big benefit then comes when location registrations must be updated. As will be explained further below, a mobility registration update for host or network only requires that the information in the corresponding attachment register (and attachment manager) be updated.

Name resolution based on the attachment registers and previously registered networks and hosts is now described. One example name resolution procedure is an iterative name resolution described in conjunction with FIG. 4 which continues with the non-limiting example relating to host node D from FIG. 3. Host F wants to reach host D. In step 1, the locator to a host D is resolved by querying a DNS server or other name resolution server with attachment register $AR_D$ for host D. The DNS can be modified to include records for locators to Attachment Registers. In step 2, the DNS returns "locator($AR_D$)" of the attachment register $AR_D$ for host D. Using the resolved locator, host F queries the attachment register $AR_D$ in step 3, which returns the name of the parent network $MN_C$ to which host D is attached in step 4. If a global locator for the attachment register $AR_C$ of moving network C is also optionally stored in the attachment register $AR_D$, that global locator is also returned.

In steps 5 and 6, the name of the network $MN_B$ to which $MN_C$ is attached is resolved. The host F queries attachment register $AR_C$ in step 5, which returns the name of the moving parent network $MN_B$ to which moving network $MN_C$ is attached in step 6. If a global locator for the attachment register $AR_B$ of moving network B is also optionally stored in the attachment register $AR_C$, that global locator is also returned. Host F proceeds in the same fashion with the name resolution in steps 6-9 until the moving or other network at the root of the tree and its attachment point to the root network is found in step 10. In this case, moving network A is attached to the root network at the root attachment point 4. That root attachment point 4 can be addressed using a global locator "locator($MN_A$)." At this point, the name host D has been completely resolved, and a communications bearer is established in step 11 between host F and host D using the following global locator "locator($MN_A$)/$MN_B$/$MN_C$/hostD." This string should be understood as a symbolic representation of any hierarchical locator format that represents the path from the root of the tree to host D. For example, each locator, network, and host name may be mapped to a binary number. The global locator can then be represented by a concatenation of these binary numbers. Such a representation can then be mapped to a standardized address format, e.g., an IP address.

Figure 4:
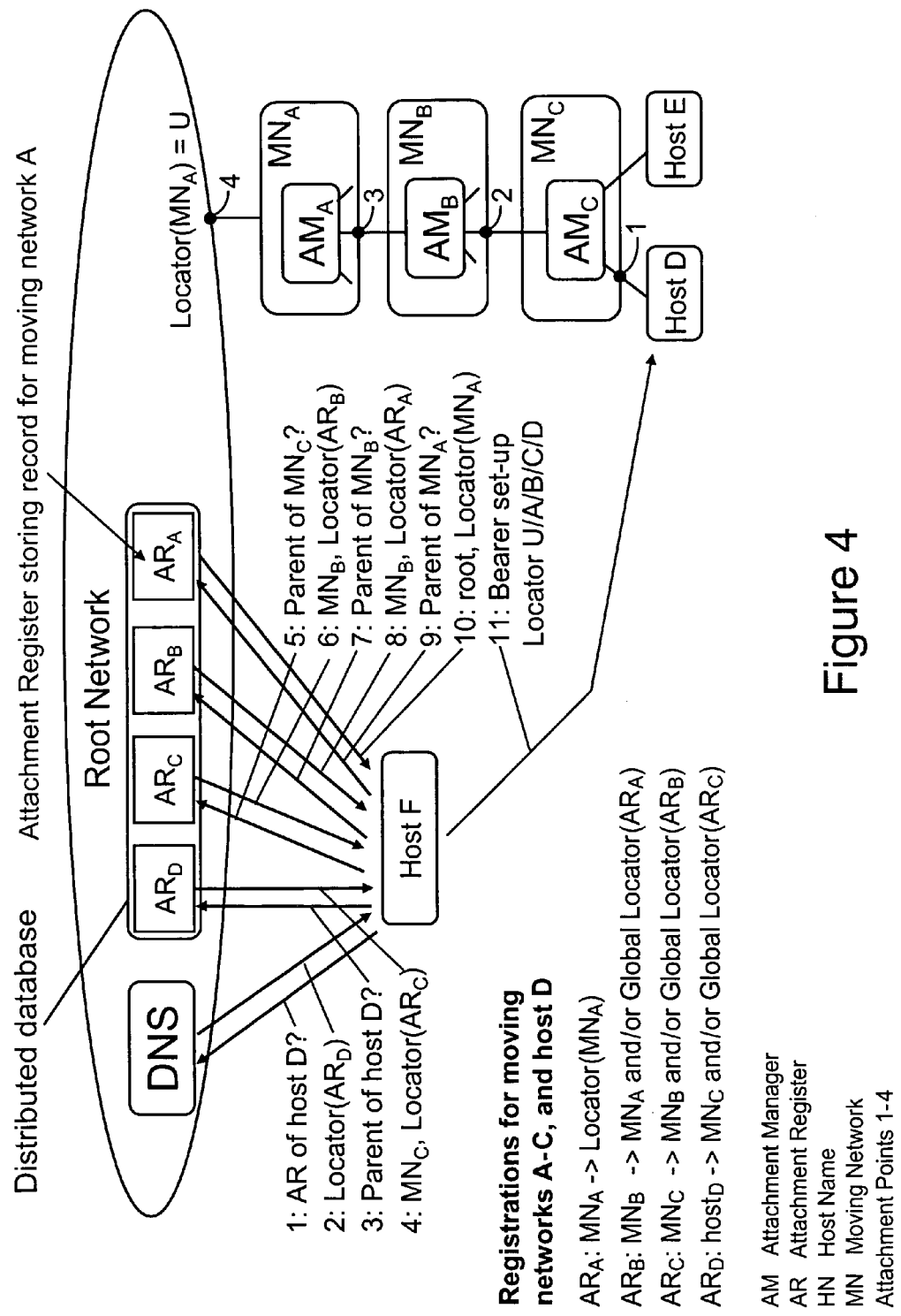
FIG. 4 illustrates a non-limiting example of an iterative name resolution procedure using globally-reachable and logically linked attachment registers.
Figure 5:
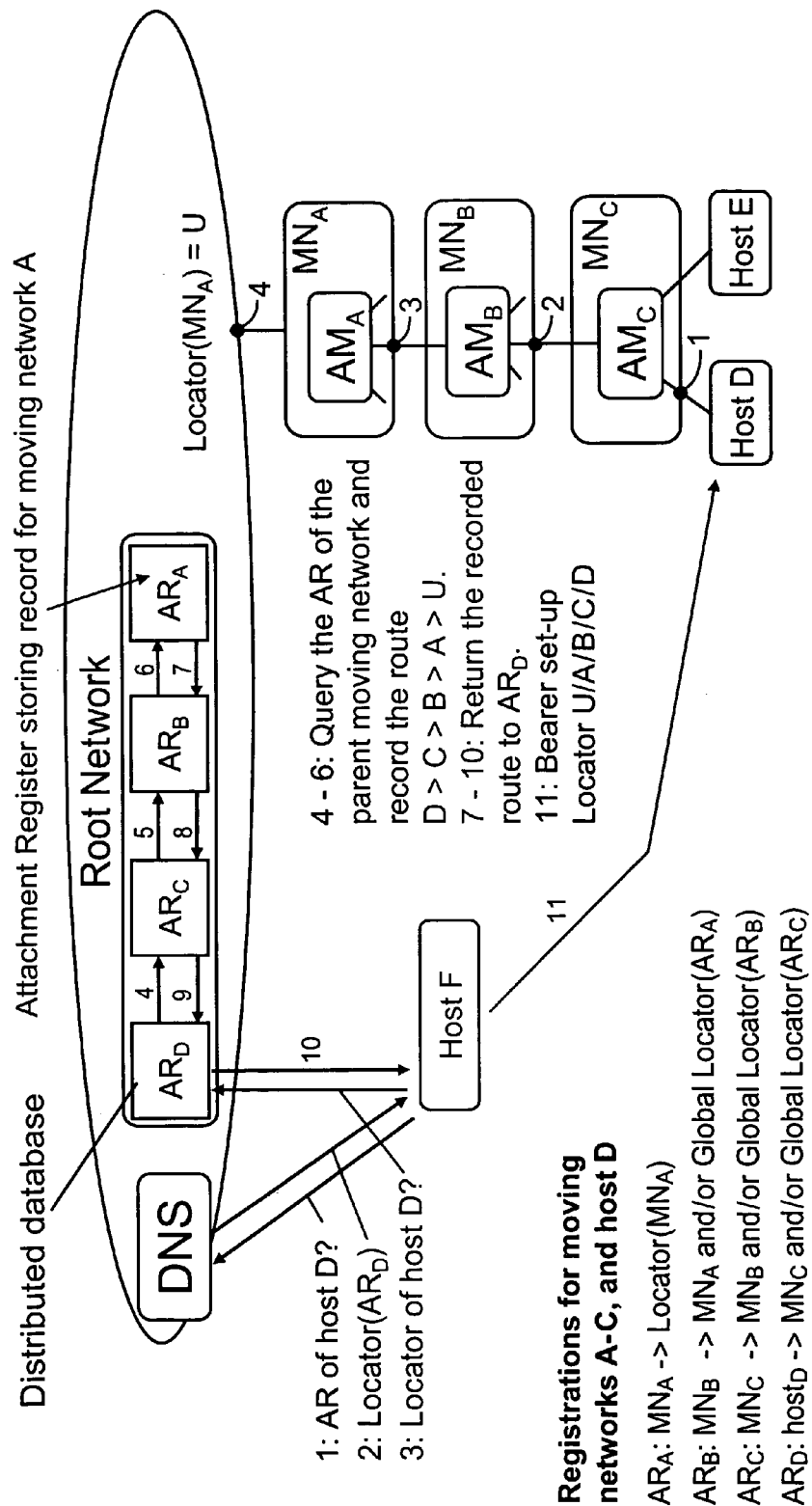
FIG. 5 illustrates a non-limiting example of a recursive name resolution procedure using globally-reachable and logically linked attachment registers.

So FIG. 4 illustrates name resolution done in an iterative fashion, where host F queries each attachment register based on the pointer obtained from the previous attachment register, and host F forms the global locator based on the sequence of network names or local locators obtained from the queries. The name resolution procedure may alternatively be performed in a recursive fashion as described now in conjunction with FIG. 5. In step 1, the locator to a host D is resolved by querying a DNS server or other name resolution server with attachment register $AR_D$ for host D. The DNS can be modified to include records for locators to Attachment Registers. In step 2, the DNS returns "locator($AR_D$)" of the attachment register $AR_D$ for host D. Using the resolved locator, host F queries the attachment register $AR_D$ in step 3. The attachment register $AR_D$ takes over from here and queries the attachment register $AR_C$ of the host's parent network $MN_C$ in step 4. Similarly, the attachment register $AR_C$ queries the attachment register $AR_B$ of its parent network $MN_B$ in step 5, and the attachment register $AR_B$ queries the attachment register $AR_A$ of its parent network $MN_A$ in step 6. This records the path from the host to the root network as D→C→B→A→U. In steps 7-10, the recorded path or route is returned to attachment register $AR_D$ and sent to correspondent host F. The communications bearer can then be set up in step 11 between host F and host D using the following global locator "locator($MN_A$)/$MN_B$/$MN_C$/hostD (U/A/B/C/D). Alternatively, attachment register $AR_A$ may return the result directly to host F. Hybrids of the iterative and recursive approaches are also possible, e.g., $AR_D$ performs an iterative name resolution procedure on behalf of host F. In both the iterative and recursive name resolution procedures, a forwarding agent may initiate the procedure instead of host F.

Continuing here with the example of FIG. 3, the global locator of the destination host D is formed by concatenating the global locator (e.g., locator($MN_A$) in FIG. 3) of the root network of the tree with the names of the networks (e.g., $MN_B$/$MN_C$/hostD) resolved in the name resolution procedure starting at the destination host at a leaf of the tree and ending at the root network. Only the names of the parent networks need be stored in the attachment registers or only global locators for the attachment registers of the parent networks need be stored in the attachments registers, or both can be stored. Indeed, storing the global locator of the attachment register of the parent network can expedite the name resolution procedure. For example, attachment register $AR_B$ stores both its parent network's name $MN_A$ and its parent network's attachment register global locator "locator($AR_A$)." The global locator of the parent network attachment register can then be obtained directly from the child network attachment register instead of resolving it via, e.g., the DNS, based on the parent network name.

Alternatively, the local locators optionally stored in the attachment registers can be used when forming the global locator of the destination host. In this case, the global locator for host D would be "global_locator($MN_A$)/$LL_{AB}$/$LL_{BC}$/$LL_{CD}$." Here, $LL_{AB}$ denotes the local locator of the network interface of $MN_A$ that $MN_B$ is attached to. This local locator is stored in $AR_B$. The local locators $LL_{BC}$ and $LL_{CD}$ are interpreted in a similar fashion, where the first index denotes the parent network being the context of the local locator, and the second index denotes the network or host that is attached to the point of attachment denoted by the local locator. These local locators are stored in attachment registers $AR_C$ and $AR_D$ respectively. The local locators registered in the attachment registers is sufficient to forward a packet down the network tree, since the local locator provides information about which point of attachment to forward the message to from each moving network. When using local locators, the attachment manager does not need to be consulted regarding the name of the attached child network in the forwarding process. As an alternative, rather than storing local locators in the attachment registers, the child network can determine its parent network's local locator from the attachment manager (AM) of the parent network.

In yet another alternative, a host can communicate with its attachment register in the root network and with the attachment manager in its parent network without relying on a name resolution procedure. In the direction towards the root network, a default path is established. A packet sent by the host D along this path towards its Attachment Register can be used to record the name of each moving network that the packet traverses on the default path. This network name information can then be used to route the packets sent in the reverse direction.

Figure 6:
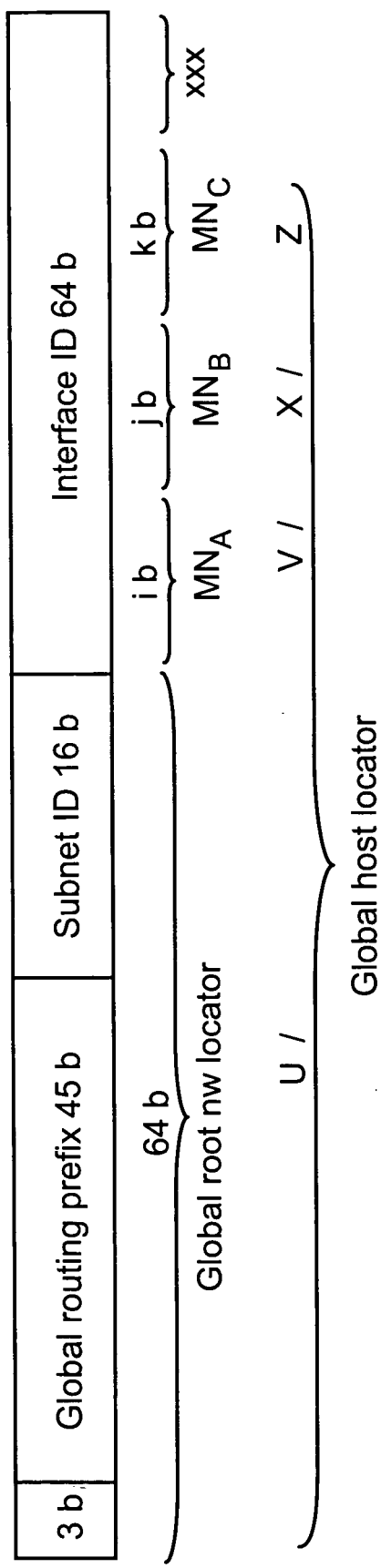
FIG. 6 illustrates a non-limiting example of locator coding in the IPv6 address architecture.

The ordered list of network names or local locators used to form a global locator for a destination host can be encoded into a binary string like an IP address. Each moving network would then have a hierarchical IP address similar to an IP subnet. The local locator alternative is particularly suitable for this approach. FIG. 6 shows one non-limiting example where the global locator is mapped to the IPv6 global routing prefix (45 bits) along with a subnet identifier of 16 bits. Together, those two fields correspond to a global root network locator mapped to the IPv6 interface ID (64 bits). Each moving network (A, B, and C) may have a fixed number of address bits (i, j, and k) corresponding to its number of leaf ports, and each leaf port may have a binary port number. The global locator of a moving network or host is then formed by concatenating the binary encoded global locator of the point of attachment of the tree to the root network with the binary encoded local locators of each moving network along the path to the addressed moving network or host. The trailing bits beyond the global address denote potential but not attached moving networks. These bits, labeled as XXX, are disregarded when the destination is reached. Routers in the moving networks forward the packets based on traditional longest prefix match. For example, moving network B in FIG. 4 has the prefix 4/3/2 stored in its routing table and forwards packets with this prefix to moving network C. The prefix 4/3/2 can be binary encoded by assigning a specific number of bits to each number. For example, if four bits are assigned to every number, then 4/3/2 would be encoded as 010000110010. Conventional longest prefix matching can be used, for example, to route packets within a tree.

Figure 7A:
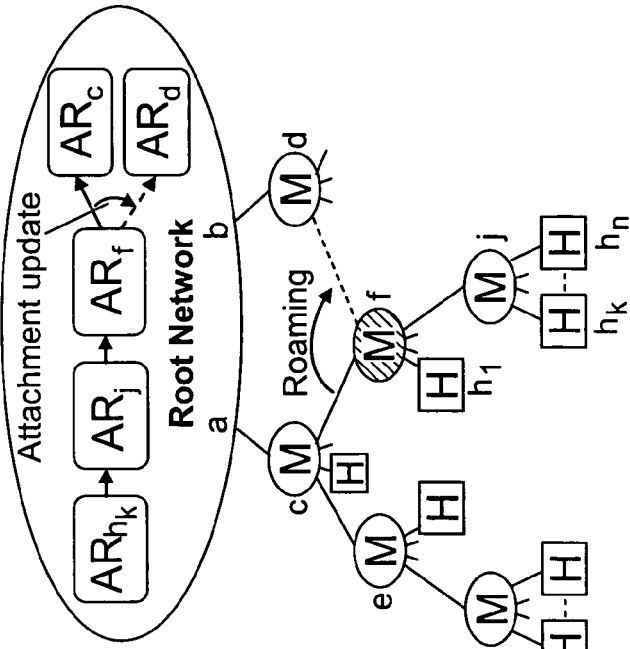
FIG. 7A illustrates a typical location update.

Some of the advantages and applications of the attachment register based technology will now be described. FIG. 7A shows a conventional location registration update situation. Moving networks c, d, e, f, g, and j are interconnected in a hierarchical tree topology where the moving networks c and d are attached at the points a and b, respectively, of a root network that includes a location register which stores a host address for each host H. The attachment points a and b can be addressed in the root network using a global locator. The attachment points a and b can also be reached by any host in the tree via a default path. Each moving network M and each host H has a globally unique name. To send a data packet to a host, the host name must be resolved to a global locator. This global locator of the destination host is formed by concatenating the global locator of the attachment point at the root of the tree with the ordered list of networks between the root network and the destination host. To reach host $h_k$, the global locator is $a/c/f/j/h_k$ which must be stored in the location register LR mapped to the host's name. When the moving network f roams from c to d with a new global locator $b/d/f/j/h_k$ mapped to the host's name, all of the hatched hosts and the moving network j must update the location register. This may lead to a flooding of update signalling messages that must be routed ultimately to the location register LR. For example, if a train is carrying a 1000 hosts, then 1000 registration updates must be performed every time the train attaches to a new parent network.

These flooding problems along with other issues are avoided by the new name resolution scheme which uses Attachment Registers (AR) located for example in the root network. As will be described in conjunction with FIG. 7B below, each host and moving network simply registers its location relative to its parent network in the hierarchical network topology. That way if the train in the above example carrying 1000 hosts changes its point of attachment, only the train needs to register its new location. The 1000 hosts do not have to perform any registration update.

Consider traditional location registers like Home Location Registers (HLR) or Home agents (in Mobile IP) that store the complete global locator of a host's or moving network's current location. In contrast, an attachment register does not store absolute locators. Instead, the attachment register only stores the name of the network that the host or the moving network is currently attached to. Each attachment register is reachable via a global address from any host or mobile network. When the locator of a host is needed, the host's name is resolved by querying a sequence of attachment registers until the network attached to the root network is found. Once this root-attached network and its global locator are resolved, the current routable locator of the host can be constructed by concatenating the locator of the root network with the ordered list of names of the networks that are traversed from the root network to the destination host at a leaf of the tree. The names of the traversed networks are returned by the attachment registers queried in a name resolution procedure. The absolute locator of a destination host is thus formed by concatenating the absolute locator of the root network with a sequence of network names (or alternatively with a sequence of local locators as described above) that describe the sequence of networks traversed from the root network of the tree to the destination host at a leaf of the tree.

Figure 7B:
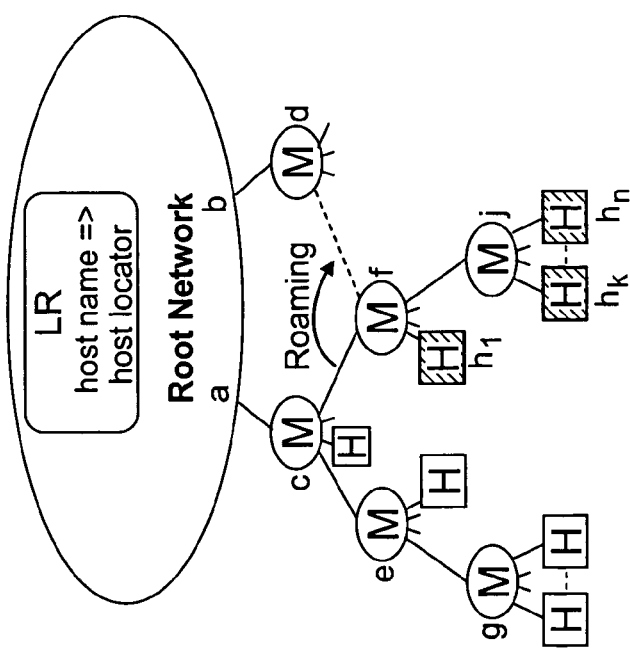
FIG. 7B illustrates a much simplified location update using globally-reachable and logically linked attachment registers.

FIG. 7B shows an application of this technology to the hierarchical network shown in FIG. 1. Again, the moving network f roams changing its point of attachment from moving network c to moving network d. Rather than all of the hosts attached to moving network f and j having to register a new host address for there names in the location register as was the case in the conventional approach shown in FIG. 1, only the moving network f hatched in FIG. 7B must update its attachment register $AR_f$ from $AR_C$ to $AR_d$.

Figure 8B:
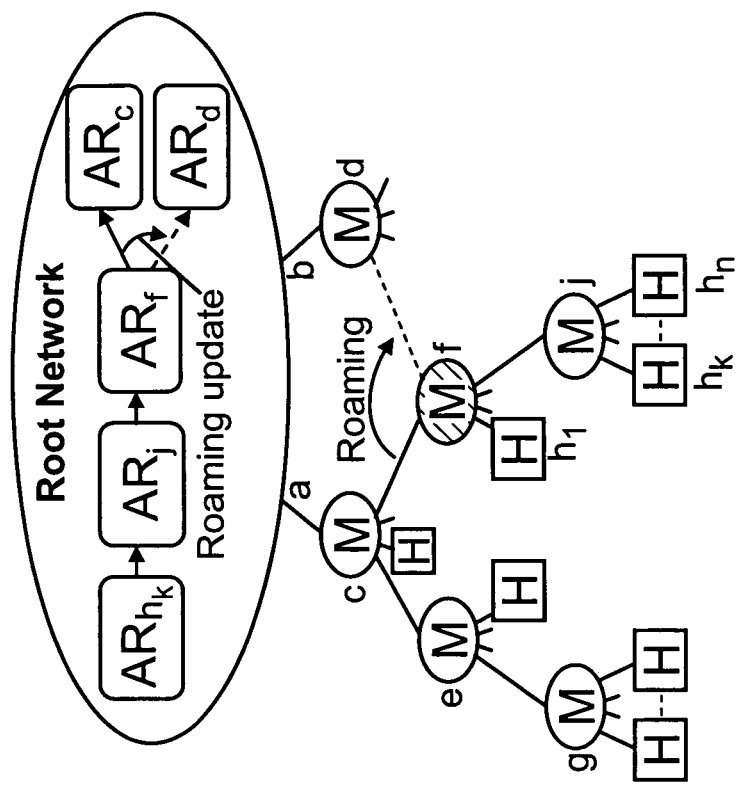
FIG. 8B illustrates a much simplified location update in a GSM type cellular system using globally-reachable and logically linked attachment registers.
Figure 8A:
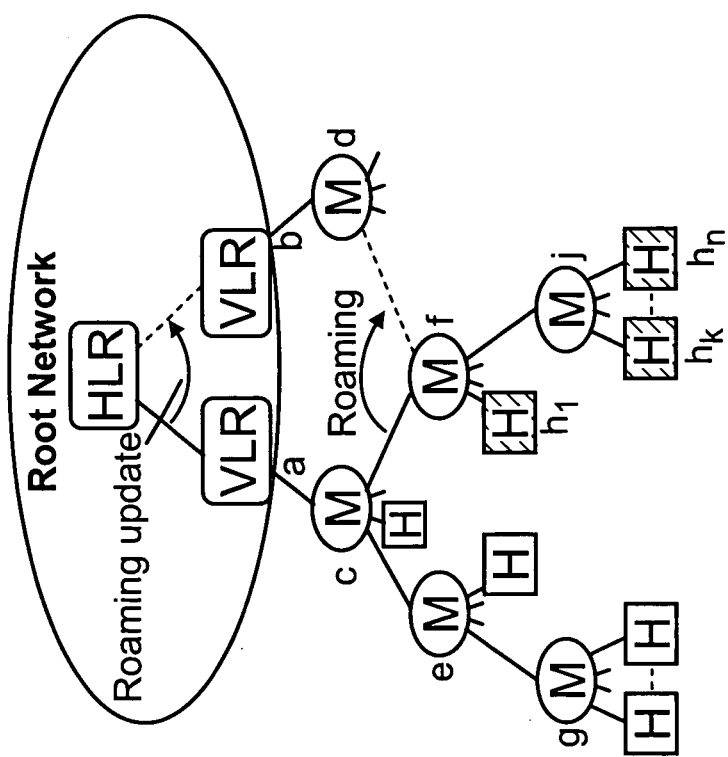
FIG. 8A illustrates a typical location update in a GSM type cellular system.

FIGS. 8A and 8B show an application of this technology to a GSM or 3G based cellular system. In the conventional approach shown in FIG. 8A, all the hatched hosts below moving network f must have their locators in HLR and VLR update when moving network f changes its point of attachment from moving network c to moving network d. As mentioned above, this may lead to a flooding of update signaling messages. In contrast, the attachment register-based approach described above is employed in the same situation in FIG. 8B. When moving network f changes its point of attachment from moving network c to moving network d, only the single hatched moving network f must update its attachment register $AR_f$.

The attachment register-based technology may also be advantageously employed in a multihoming application.

Figure 9B:
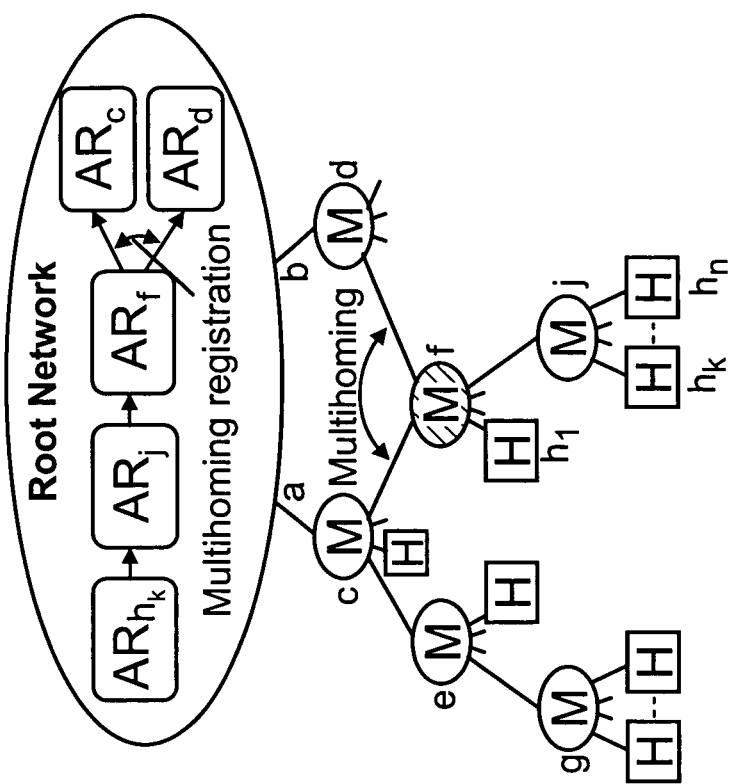
FIG. 9B illustrates a much simplified multi-homing registration using globally-reachable and logically linked attachment registers.
Figure 9A:
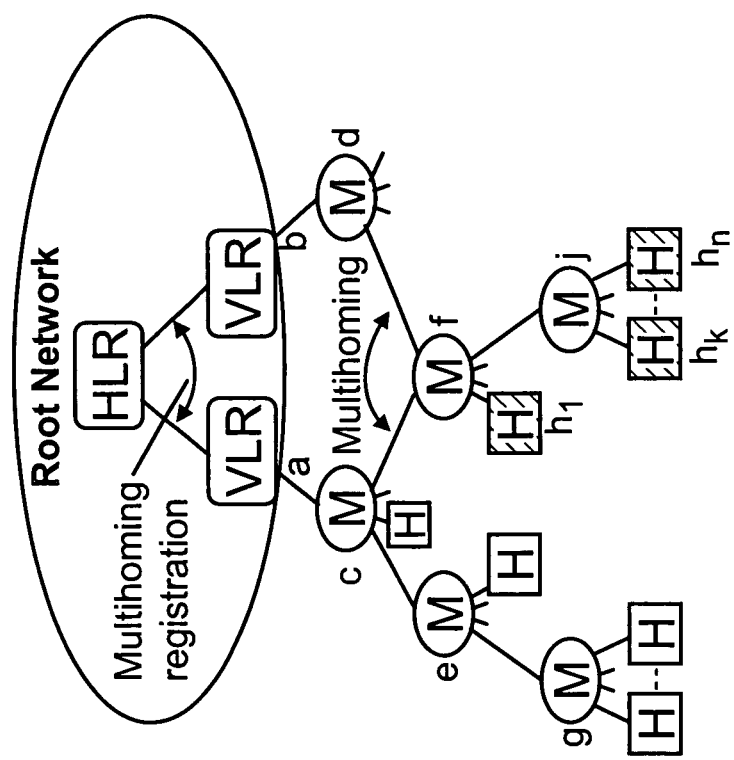
FIG. 9A illustrates a typical multi-homing registration.

Multihoming may be understood in conjunction with FIG. 9A which shows a typical GSM or 3G cellular network in which network nodes (moving networks and hosts) attach to two redundant nodes with one of the nodes typically being a primary node to be used and the other being a secondary or backup node to use if the primary node is unavailable or not functioning. The two VLRs could for example be owned or operated by two different telcom operators. Moving network f is multihomed by being attached to both moving network c and moving network d. In this multihomed situation, all hatched hosts below moving network f must have duplicate locators or addresses in the HLR and one locator or address in each of the two VLRs. As a result, the number of registrations is doubled.

In contrast, FIG. 9B illustrates a multihoming configuration that takes advantage of the attachment register based registration and name resolution technology. Moving network f is multihomed by being attached to both moving network c and moving network d. In this multihomed situation, the attachment register $AR_f$ registers both attachments. As a result, addresses may be resolved as described above via concatenation of attachment register contents to provide a first host address to host $h_k$ via moving network c (a/c/f/j/$h_k$) and a second host address to host $h_k$ via moving network d (b/d/f/j/$h_k$). Each address corresponds to a specific path between the root network and the host. The first path traverses network c, and the second path traverses network d. Using performance parameters of the communication links as well as of networks stored in the attachment registers as described above, performance parameters for each path and each corresponding address can be calculated. The performance parameters for the links and networks can be returned by the attachment registers along with the locator information in the name-to-locator resolution procedure.

Figure 10B:
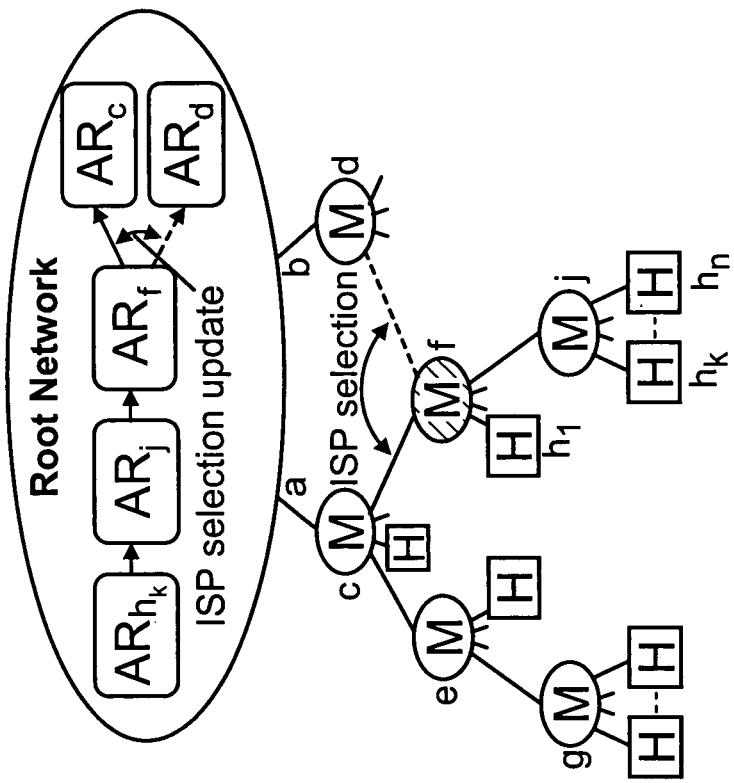
FIG. 10B illustrates a much simplified dynamic ISP selection using globally-reachable and logically linked attachment registers.
Figure 10A:
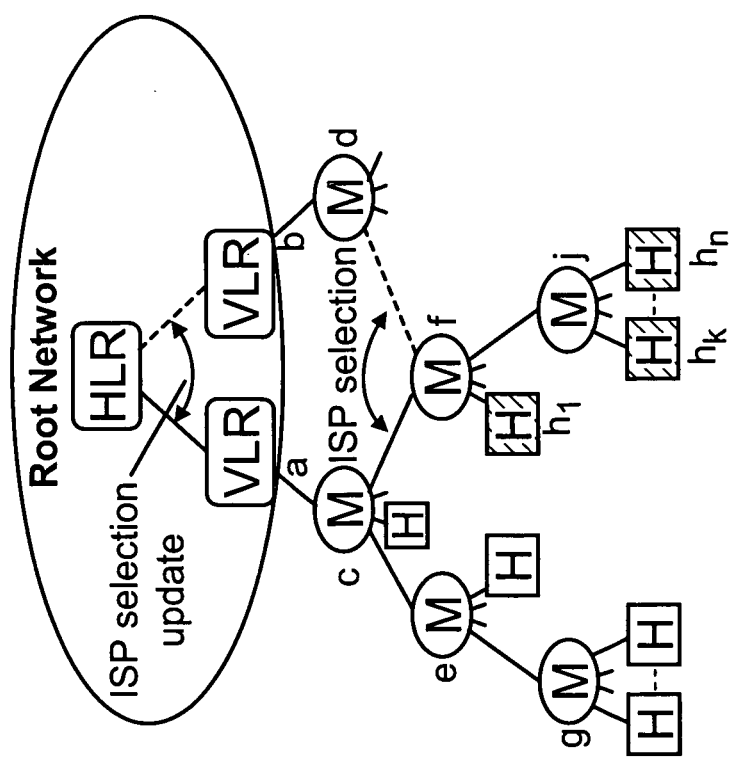
FIG. 10A illustrates a typical dynamic ISP selection.

The attachment register-based technology may also be advantageously employed in a dynamic ISP selection application. Dynamic ISP selection may be understood in conjunction with FIG. 10A which shows a typical GSM or 3G cellular network in which a host or moving network wants to change its Internet service provider (ISP). The old ISP employs the VLR attached to root network port a, and the new ISP employs the VLR attached to root network port b. The old locator to host $h_k$ is via moving network c. When the host changes to the new ISP, a new locator to host $h_k$ is via moving network d. All hatched hosts below moving network f must update their addresses in the HLR and in their respective ISP's VLR. In contrast, FIG. 10B shows how using the attachment register-based technology permits a much less onerous ISP change. Only hatched moving network f needs to update its attachment register $AR_f$. As a result, addresses may be resolved as described above via concatenation of attachment register contents to provide a first host address to host $h_k$ via moving network c (a/c/f/j/$h_k$) and a second host address to host $h_k$ via moving network d (b/d/f/j/$h_k$).

Figure 11:
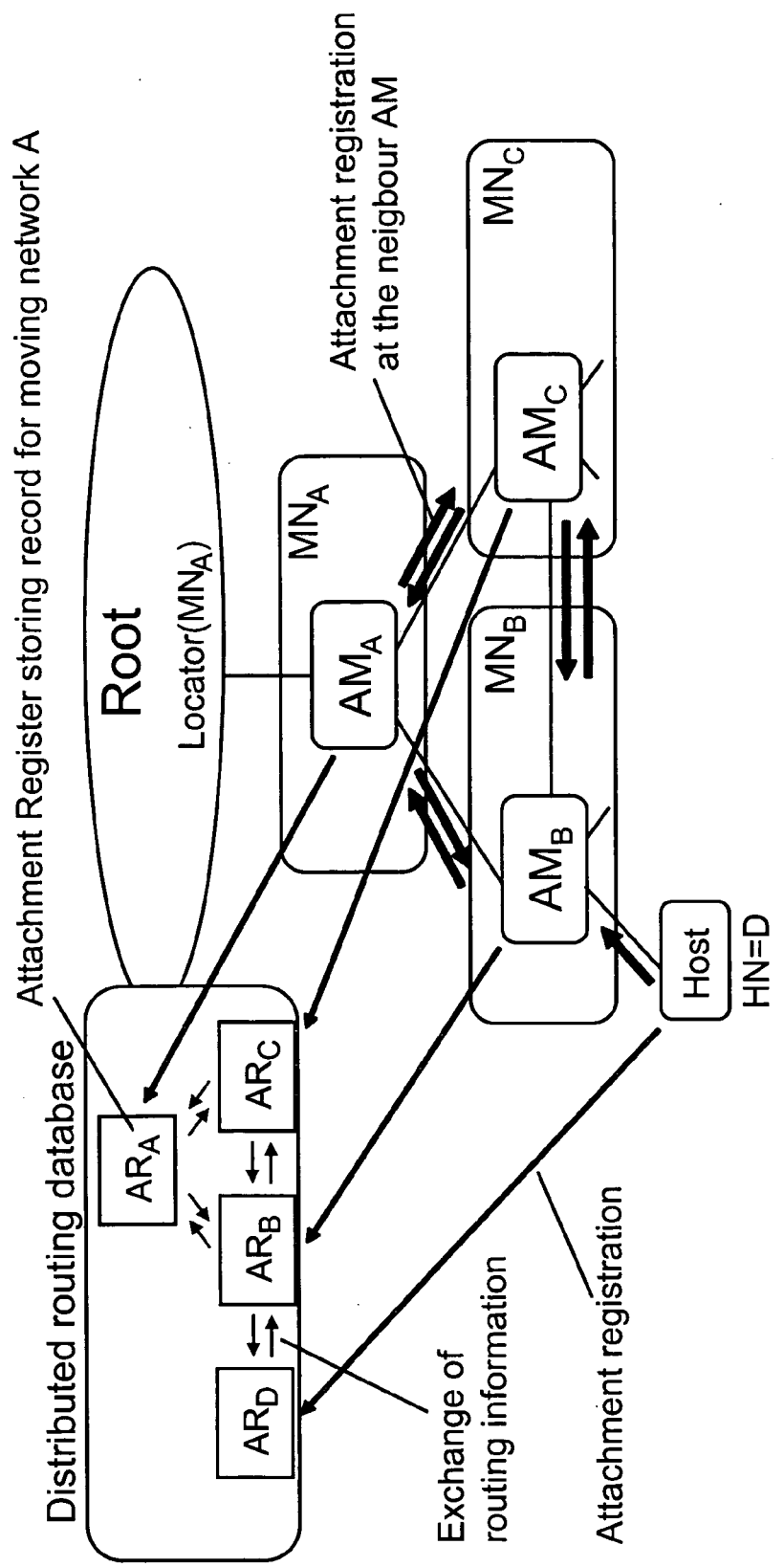
FIG. 11 illustrates routing signaling over an arbitrary network topology using globally-reachable and logically linked attachment registers.

The registration and name resolution technology described above may also be used for interdomain routing over networks (both moving and fixed) that are interconnected in arbitrary network topologies. Consider a moving network that attaches to several neighbor networks establishing communication links having different performance characteristics as shown for example in FIG. 11. Each attachment to a neighbor network is registered in the attachment registers corresponding to the moving network, including the name of the neighbor networks, along with a service level specification (e.g., quality of service) associated with the link between the two networks. Global locators to the attachment registers of the neighbor networks may preferably also be registered. When all interconnected networks and hosts have registered in this fashion, their attachment registers constitute a distributed, link-state database for the interconnection of the networks.

The attachment registers may now exchange interdomain link state and reachability information. An example of distributing link state information is to distribute connectivity information to a neighbor network about all other neighbor networks. This information can then be propagated to the attachment registers of all interconnected networks. The attachment registers address each other based on the registered global locators to the attachment registers of the neighbor networks. Routing tables are then built on behalf of the associated networks using for example principles used in legacy interdomain routing protocols including RIP and OSPF. Advantageously, the routing protocol signaling is thus performed between the attachment registers of the networks, rather than between the networks themselves. Locating the attachment registers in a fixed network reduces transmission costs and improves the predictability of the connectivity for the execution of the routing protocols compared to wireless links.

To route a message, an originating node (not shown) queries its attachment register about routing information for the destination host D. Based on its participation in the interdomain routing and the built-up routing tables, the originating node's attachment register can now return a routing path to the originating node which uses that routing path to route packets to the destination host D. As mentioned above, the link state database stored in the attachment registers preferably (though not necessarily) includes service level parameters for the interconnection between neighbor networks. This service level parameter information may be used by interdomain quality of service (QoS) routing protocols, which can operate between the attachment registers.

The attachment register based technology described above may also be used to reduce handover signalling in cellular networks. When a mobile host with an active call receives a new global locator due to a handover higher up in the network tree hierarchy, the mobile host typically informs the correspondent host about its new global locator by transmitting signalling regarding the handover over the wireless interface. Alternatively, information about handover events and new locators may be broadcasted from the node that is handed over to all the hosts at lower branches/leafs in the network tree hierarchy. Both approaches, in particular the latter approach, involve considerable signalling over the wireless interface where resources are "scarce."

Figure 12:
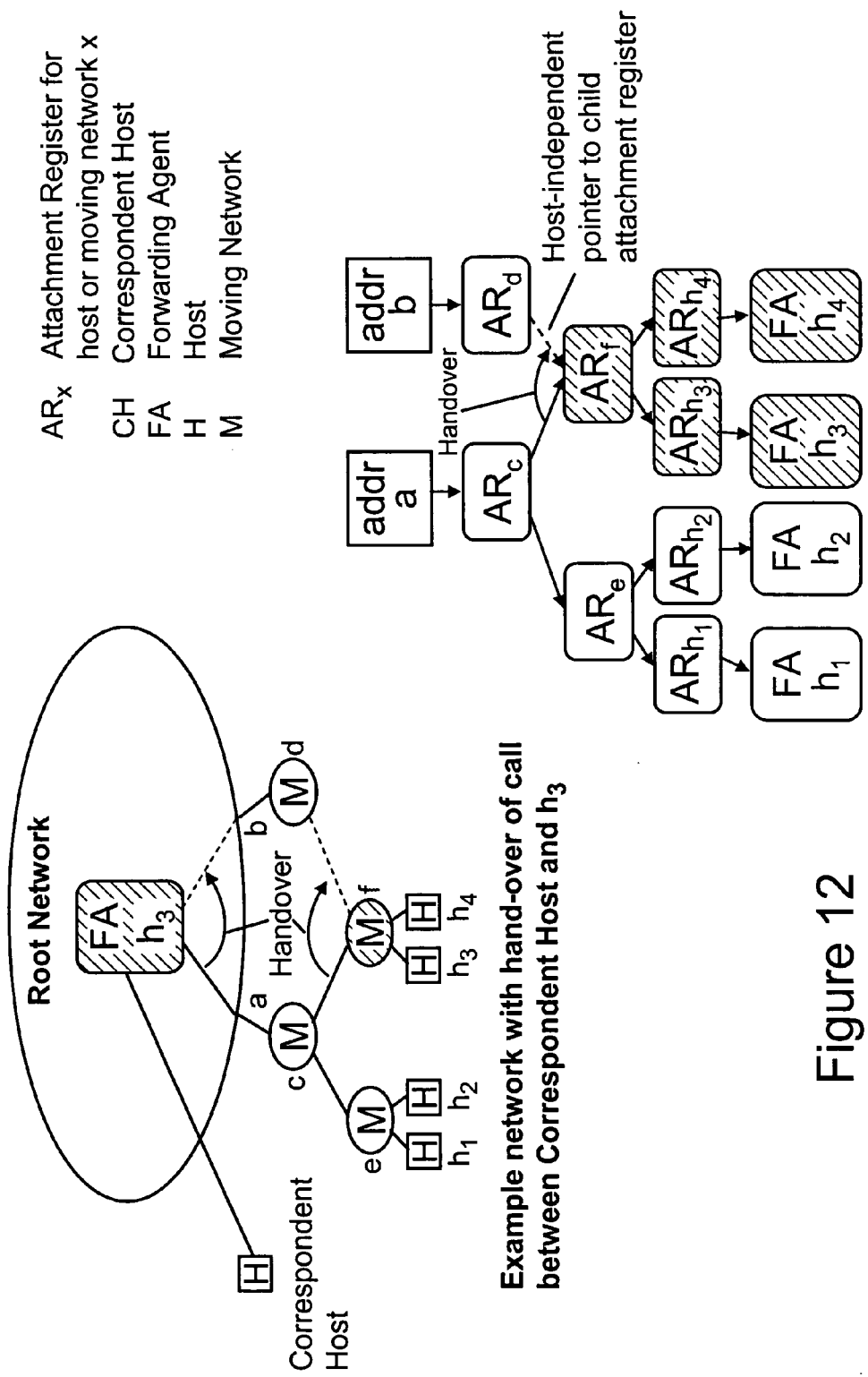
FIG. 12 illustrates handover signaling over an arbitrary network topology using globally-reachable and logically linked attachment registers.

A host forwarding agent in conjunction with the attachment register based technology may be introduced in the root network to reduce the amount of handover signalling over wireless interfaces and also to hide the mobility events from the correspondent node. Referring to FIG. 12, the correspondent host receives the global locator of the forwarding agent of host 3 (rather then the host 3 itself) from a name resolution procedure for that host 3. The name of host 3 can be resolved to the global locator of the forwarding agent of host 3 by the DNS. For example, the DNS can be modified to include a global locator for forwarding agents. The forwarding agent then initiates a name-to-locator resolution procedure for host 3 using, for example, the iterative or recursive procedures described above. When the global locator of host 3 is returned to the forwarding agent, the forwarding agent can use this locator to send packets to host 3. Any user data for the host 3 is directed first to the forwarding agent of host 3, regardless of the location of host 3, which then forwards that user data to host 3. The forwarding agent can be seen as a proxy for the host. Only the forwarding agent needs to know the actual location of host 3. Alternatively, the attachment register corresponding to the destination host 3 stores the global locator of host 3's associated forwarding agent, and returns this locator to the correspondent host. The correspondent host now sends the traffic to the forwarding agent for host 3, which forwards it to the destination host 3. The forwarding agent is updated about the global locator of the destination host 3 by referencing the attachment register for host 3.

Information about handover events resulting in new global locators may also be broadcasted over the root network from the attachment register of the node that is handed over (moving network f in FIG. 12) to all the attachment registers of the moving networks and hosts lower in the network topology. The attachment register of host 3 thus receives a new global locator during an ongoing call involving host 3 as a result of a handover of the moving network f from network c to network d higher up in the tree. The attachment register of host 3 informs the forwarding agent of host 3 about the new global locator. This forwarding agent uses the new locator to address host 3 during the continued call.

When handover occurs somewhere in the tree so that the locator of the destination host must be updated, information about this event is broadcasted between the attachment registers that are affected by the mobility event, i.e., the attachment registers associated with networks in the network topology that are located below the network that performed the handover. This broadcast signalling requires that the attachment registers register the attachment registers of their immediate child networks in the same fashion as the registration of the attachment registers of the parent networks. The attachment register of the destination host can now resolve the new global locator to the destination host and update the host's associated forwarding agent about the new global locator. The forwarding agent then redirects the traffic to the new global locator of the destination host. Thus, the correspondent host does not need to be updated regarding the new global locator of the destination host.

There are many advantages to this attachment register based network management. It allows for distribution of the responsibility for mobility registrations. There is thus no need for a centralized node that handles the mobility registrations for all moving networks or hosts in the tree. The scheme reduces mobility registration signalling due to mobility events among the moving networks and hosts. In traditional mobility solutions, the global locator of a host is stored in a location register or mobility agent. Such entities must be updated as soon as the global locator is changed. By contrast, using the present technology requires only the attachment register of the host or network directly involved in a roaming event be updated. Roaming of a large moving network with many attached subnetworks and hosts would thus not require location update signalling for every attached subnetwork or host. For routing and handover applications, signalling to a large extent can be handled between attachment registers in a fixed network, thus relieving the signalling load between networks, and in the handover case, over the more "expensive" wireless interfaces. The so-called pin-ball routing problem of the Nemo solution can also be avoided by the use of the global locator obtained in the name-to-locator resolution procedure.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 U.S.C. §112 unless the words "means for" are used.

The invention claimed is:

1. A method for use in interconnected communications networks including movable networks and mobile hosts, comprising:
   providing a set of globally-reachable attachment registers, where at least some of the movable networks and mobile hosts each has a corresponding attachment register and where at least some of the globally-reachable attachment registers are located in different network entities, and
   storing information in the corresponding attachment registers that establishes one or more logical links between the attachment registers,
   wherein the logical links between certain ones of the attachment registers are useable to perform one or more network communication functions and wherein the globally-reachable attachment registers are arranged as a distributed database and are not arranged in a single register entity, and
   wherein one of the movable networks changes from a first point of attachment in the interconnected communications networks at a first neighbor node to a second point of attachment at a second neighbor node, the method further comprising:
   updating the attachment register corresponding to the one movable network to change a logical link from the attachment register corresponding to the first neighbor node to the attachment register corresponding to the second neighbor node; and
   wherein, when the one moveable network moves to the second point of attachment at the second neighbor node, all lower level mobile hosts in the movable network need not update their mobility registrations with a central location register because of the updating of the globally-reachable attachment register corresponding to the one movable network to thereby avoid a large number of registrations or other location updates that would otherwise need to be signaled and processed.

2. The method in claim 1, wherein the attachment registers are located physically separate from the corresponding networks and hosts.

3. The method in claim 1, wherein the interconnected networks and hosts are configured in a hierarchical topology.

4. The method in claim 3, wherein the attachment registers are located in a network at a highest level of the hierarchical topology.

5. The method in claim 3, wherein the logical link for a network closest to a network at the highest level of the hierarchical topology includes an association with a name of the closest network and a pointer pointing to a highest level network locator associated with a point of attachment of the closest network to the highest level network.

6. The method in claim 1, wherein the logical links include an association with a name of a network or host and a pointer associated with a neighbor network of that network or host, and wherein the pointer points to one or more of the following: a name of the neighbor network, a global locator of the attachment register corresponding to the neighbor network, and a combination of a name of the neighbor network and a local locator of a point of attachment to the neighbor network.

7. The method in claim 1, wherein at least some of the logical links are associated with communication links to neighbor networks and include a specification of performance parameters of that communication link including one or more of bandwidth, packet delay, or packet loss rate.

8. The method in claim 1, wherein the attachment registers are independently accessible by each of the networks and hosts.

9. The method in claim 1, wherein the logical links are established as part of a registration operation.

10. The method in claim 1, wherein an attachment register for a movable host only stores a subset of a global locator of the movable host's current location.

11. A method for use in interconnected communication networks and hosts, at least some of the networks and hosts each having a corresponding, globally-reachable attachment register, where the globally-reachable attachment registers are arranged as a distributed database and there are logical links between certain ones of the globally-reachable attachment registers, the method comprising:
    querying one or more of the globally-reachable attachment registers at one or more network entities different from network entities of others of the globally-reachable attachment registers in the distributed database to obtain or modify logical link information in the one or more globally-reachable attachment registers, and
    using the logical link information to perform one or more network communications functions,
    wherein one of the networks is a movable network, the method further comprising the movable network updating the logical link information in its corresponding attachment register when the movable network has moved to a new point of attachment.

12. The method in claim 11, further comprising:
    each network and host performing location registration by storing current logical link information in its corresponding attachment register.

13. The method in claim 11, wherein each host and network has a name and is addressable using a corresponding network locator, the method further comprising:
    using the logical link information to resolve a name of a host to a global network locator of a host attached to one of the networks.

14. The method in claim 13, wherein the interconnected communication networks and hosts are configured in a hierarchy, the method further comprising:
    querying a sequence of attachment registers associated with the host and with networks located in the hierarchy along a path between the host and a root network to generate a list of items including the host name, names of networks traversed along the path, and a locator of an attachment point to the root network, and
    using the list of items to generate the global network locator of the host.

15. The method in claim 11, further comprising:
    performing routing related signaling on behalf of certain ones of the networks and hosts using their corresponding attachment registers.

16. The method in claim 11, further comprising:
    performing mobility related signaling on behalf of certain ones of the networks and hosts using their corresponding attachment registers.

17. The method in claim 11, further comprising:
    performing multi-homing related signaling on behalf of certain ones of the networks and hosts using their corresponding attachment registers.

18. The method in claim 11, further comprising:
    performing dynamic Internet server (ISP) selection related signaling on behalf of certain ones of the networks and hosts using their corresponding attachment registers.

19. The method in claim 11, wherein some of the networks are movable networks, the method further comprising:
    performing handover related signaling on behalf of certain ones of the movable networks and hosts using their corresponding attachment registers.

20. The method in claim 19, wherein the interconnected communication networks and hosts are configured in a hierarchy, and wherein information about a handover event is signaled from an attachment register corresponding to a network handed-over to the attachment registers associated with one or more networks below the handed-over network in the hierarchy.

21. Apparatus for use in an internetwork of communications networks including movable networks and hosts including mobile hosts, comprising:
    a group of globally-reachable attachment registers, where at least some of the movable networks and mobile hosts each has a corresponding attachment register and where at least some of the globally-reachable attachment registers are located in different network entities, and
    electronic circuitry for storing information in the corresponding attachment registers that establishes one or more logical links between the attachment registers,
    wherein the logical links between certain ones of the attachment registers are useable to perform one or more network communication functions and wherein the globally-reachable attachment registers are arranged as a distributed database and are not arranged in a single register entity,
    wherein one of the movable networks is changeable from a first point of attachment in the interconnected communications networks at a first neighbor node to a second point of attachment at a second neighbor node, and
    wherein the electronic circuitry is configured to update the attachment register corresponding to the movable network to change a logical link from the attachment register corresponding to the first neighbor node to the attachment register corresponding to the second neighbor node.

22. The apparatus in claim 21, wherein the attachment registers are located physically separate from the corresponding networks and hosts.

23. The apparatus in claim 21, wherein the internetwork of communication networks and hosts is configured in a hierarchical topology.

24. The apparatus in claim 23, wherein the attachment registers are located in a network at a highest level of the hierarchical topology.

25. The apparatus in claim 23, wherein the logical link for a network closest to a network at the highest level of the hierarchical topology includes an association with a name of the closest network and a pointer pointing to a highest level network locator associated with a point of attachment of the closest network to the highest level network.

26. The apparatus in claim 21, wherein the logical links include an association with a name of a network or host and a pointer associated with a neighbor network of that network or host, and wherein the pointer points to one or more of the following: a name of the neighbor network, a global locator of the attachment register corresponding to the neighbor network, and a combination of a name of the neighbor network and a local locator of a point of attachment to the neighbor network.

27. The apparatus in claim 21, wherein at least some of the logical links are associated with communication links to neighbor networks and include a specification of performance parameters of that communication link including one or more of bandwidth, packet delay, or packet loss rate.

28. The apparatus in claim 21, wherein the attachment registers are independently accessible by each of the networks and hosts.

29. The apparatus in claim 21, wherein the electronic circuitry is configured to establish the logical links as part of a registration operation.

30. The apparatus in claim 21, wherein an attachment register for a movable host is configured to only store a subset of a global locator of the movable host's current location.

31. Apparatus for use in an internetwork of communication networks including movable networks and hosts including mobile hosts, at least some of the movable networks and mobile hosts each having a corresponding, globally-reachable attachment register, where the globally-reachable attachment registers are arranged as a distributed database and there are logical links between certain ones of the globally-reachable attachment registers, the apparatus comprising electronic circuitry configured to:
  query one or more of the globally-reachable attachment registers at one or more network entities different from network entities of others of the globally-reachable attachment registers in the distributed database to obtain or modify logical link information in the one or more globally-reachable attachment registers, and
  use the logical link information to perform one or more network communications functions,
  wherein the electronic circuitry is further configured to update the logical link information in one of the movable network's corresponding attachment register when the movable network has moved to a new point of attachment.

32. The apparatus in claim 31, wherein the apparatus includes a correspondent host.

33. The apparatus in claim 31, wherein the apparatus includes one of the attachment registers.

34. The apparatus in claim 31 wherein the electronic circuitry is further configured to:
  perform location registration by storing current logical link information with one or more corresponding attachment registers.

35. The apparatus in claim 31, wherein each host and network has a name and is addressable using a corresponding network locator, and wherein the electronic circuitry is further configured to:
  use the logical link information to resolve a name of a host to a global network locator of a host attached to one of the networks.

36. The apparatus in claim 35, wherein the electronic circuitry is further configured to:
  query a sequence of attachment registers associated with the host and with networks located in the hierarchy along a path between the host and a root network to generate a list of items including the host name, names of networks traversed along the path, and a locator of an attachment point to the root network, and
  use the list of items to generate the global network locator of the host.

37. The apparatus in claim 31, wherein the electronic circuitry is further configured to:
  use the logical link information to perform routing related signaling on behalf of certain ones of the networks and hosts using their corresponding attachment registers.

38. The apparatus in claim 31, wherein the electronic circuitry is further configured to:
  perform mobility related signaling on behalf of certain ones of the networks and hosts using their corresponding attachment registers.

39. The apparatus in claim 31, wherein the electronic circuitry is further configured to:
  perform multi-homing related signaling on behalf of certain ones of the networks and hosts using their corresponding attachment registers.

40. The apparatus in claim 31, wherein the electronic circuitry is further configured to:
  perform dynamic Internet server (ISP) selection related signaling on behalf of certain ones of the networks and hosts using their corresponding attachment registers.

41. The apparatus in claim 31, wherein some of the networks are movable networks, and wherein the electronic circuitry is further configured to:
  perform handover related signaling on behalf of certain ones of the movable networks and hosts using their corresponding attachment registers.

42. The apparatus in claim 41, wherein the interconnected communication networks and hosts are configured in a hierarchy, and wherein the electronic circuitry is further configured to signal information about a handover event from an attachment register corresponding to a network handed-over to the attachment registers associated with one or more networks below the handed-over network in the hierarchy.

* * * * *